United States Patent
Maravelis (10) Patent No.: US 11,823,309 B1
(45) Date of Patent: Nov. 21, 2023

(54) APPARATUS, SYSTEM AND METHOD FOR DATA RESTRUCTURING AND VISUALIZATION

(71) Applicant: Simply Marvelous, Inc., Irvine, CA (US)

(72) Inventor: John Peter Lira Maravelis, Wilmington, MA (US)

( * ) Notice: Subject to any disclaimer, the term of this patent is extended or adjusted under 35 U.S.C. 154(b) by 153 days.

(21) Appl. No.: 17/555,202

(22) Filed: Dec. 17, 2021

Related U.S. Application Data (60) Provisional application No. 63/127,111, filed on Dec. 17, 2020.

(51) Int. Cl.
  *G06T 11/20* (2006.01)
  *G06F 16/25* (2019.01)
  *H04L 67/55* (2022.01)

(52) U.S. Cl.
  CPC .......... *G06T 11/206* (2013.01); *G06F 16/258* (2019.01); *H04L 67/55* (2022.05)

(58) Field of Classification Search
  CPC ....... G06T 11/206; G06F 16/258; H04L 67/55
  See application file for complete search history.

(56) References Cited

U.S. PATENT DOCUMENTS 9,672,200 B1 * 6/2017 Krappe ............... G06F 21/6227

* cited by examiner

*Primary Examiner* — Michelle L Sams
(74) *Attorney, Agent, or Firm* — Build IP, LLC; Robert V. Donahoe (57) ABSTRACT

A method for creating at least one of a chart, plot or graph in real time using an application operating on a device. Including receiving, with the first application, a single input to the graphical user interface and automatically, in response to receipt of the single user input. The method also includes transmitting the spreadsheet and an identification of the chart for receipt at the remote server, deconstructing, by the remote server, the plurality of data-pairs such that the respective first values and the respective second values included in the plurality of data-pairs are organized separately from one another in the database, reconstructing, by the remote server, the plurality of data-pairs such that the respective first values and the respective second values are organized in a plurality of matched pairs, respectively, for representing as respective points in the chart, associating the plurality of matched pairs with the chart, transmitting the plurality of matched pairs to the first application on the device, and displaying the chart with the first application on the device.

16 Claims, 6 Drawing Sheets

APPARATUS, SYSTEM AND METHOD FOR DATA RESTRUCTURING AND VISUALIZATION

BACKGROUND OF INVENTION

1. Field of Invention

This invention relates generally to processing data and displaying the data in a chart or graph format. More specifically, at least one embodiment relates to an apparatus, system and a method for deconstructing a data set in a manner that greatly improves the processing efficiency required to subsequently render the data in the data set for display as a chart, graph, plot or other visualization.

2. Discussion of Related Art

Today, data is at the center of almost all human endeavors. Even fundamental human activities such as agriculture employ technology for planting, irrigation and harvest. Data driven technology can improve agriculture productivity to allow farmers, ranchers, foresters and other agricultural professionals to more efficiently utilize limited resources. Data driven technology to improve productivity also allows them to improve business efficiency to support an economically viable business. This is tremendously important because agriculture provides most of the world's food and fabrics.

Farmers, ranchers, foresters and other agricultural professionals need increased capabilities to cultivate more land and handle more livestock with less labor. For this reason, farmers are incorporating smart, Internet-connected technology including robotics to meet increased global demand, while dealing with declining resources and rising labor costs.

Data visualization is an approach in which data and information is represented in the form of a chart, graph or plot. In the case of data saved in a table format, for example, a spreadsheet or CSV file, the discrete data points can be plotted in a graph or chart using two or more axes. The application of data driven technology solutions regardless of industry is hindered because today's approaches rely on outdated tools for data visualization. For example, traditional approaches to data input, processing and display provide a slow inefficient approach for data visualization. In the case of agriculture, a farmer or rancher must first inventory their grains and other crops, livestock, etc., before entering the data in a spreadsheet on a computer. The task of converting the discrete data from a table format to a more useful visual form forces the individual to open an application and apply a specialized set of rules to display the data in a visual form. Every application requires that the user understand the specialized rules for that application. This is a hindrance across industries but is more problematic in industries like agriculture where the data entry is performed in the field. Regardless of industry, even individuals who regularly use spreadsheets frequently lack the knowledge of the process required to convert spreadsheet data to a useful data visualization. Yet, these same fields require the professionals to make real time data driven decisions daily.

Prior attempts to efficiently deconstruct spreadsheet and other chart-type data for the later reconstruction and visualization have not met basic performance objectives. In one approach, spreadsheet data that includes pairs of associated values (for example, an x-y pair) has been deconstructed and saved as data pairs of each x-y or separately as an x-value and then a y-value. While these approaches intuitively appear to make sense, they do not provide satisfactory results. Instead, these approaches fail to properly display the data when they are reconstructed for a visualization. The visualizations either do not display, display a partial set of data, fail to match the associated x-y values properly or fail to graph correctly.

The preceding and other approaches are coded in a manner that fails to provide an efficient process for data visualization especially for any approach to be scaled across hundreds or thousands or more users. This is a significant drawback given the reliance on scalable cloud-based solutions to provide software applications today.

SUMMARY OF INVENTION

Therefore, there is a need for systems and methods that provide real time data visualization of data from a spreadsheet. There is also a need for data visualizations such as charts that illustrate productivity with reference to a metric evaluated over time. According to one aspect a software application is coded in JavaScript where the code is structured and organized for the real time processing and rendering of data visualizations of data originating in spreadsheets. In some embodiments, these software applications operate in a cloud-based environment remote from the user and can scale across thousands of users with no discernible degradation in performance.

As used herein, the term "data visualization" refers to the graphical representation of information and data in the form of a chart, graph, or plot. One of ordinary skill in the art based on the disclosure herein will recognize that each of a bar chart, a pie chart, a column chart, an area chart and a line chart are data visualizations. One of ordinary skill in the art based on the disclosure provided herein will also understand that a picture is not a data visualization as the term is used herein.

As used herein, the terms "real time" or "substantially real time" refer to operations that are completed within one second. One of ordinary skill in the art based on the disclosure herein will recognize that a deconstruction of data for storage in a database followed by an immediate reconstruction of the same data and the rendering of a visualization of the data is performed in real time where the visualization is presented to the user within one second of a user input that initiates of the act of deconstructing the data.

It is to be understood that the terminology used herein is for the purpose of describing particular embodiments only, and is not intended to be limiting. As used herein, the term "computer" generally refers to hardware or hardware in combination with one or more program(s), such as can be implemented in software. As it is used in this description, the term "computing device" generally refers to desktop computers, laptop computers, hand-held computing devices, as well as any other type of computer system. Computing devices can be implemented electrically, optically, quantumly, biologically, and/or mechanically or in any combination of these technologies. A computing device typically includes a processor and a memory as well as other types of electronic devices. A processor may include any device that processes information or executes instructions.

As it is used in this description, the term "protocol" generally refers to a set of rules and/or procedures relating to code. As it is used in this description, "code" generally refers to computer program code, which may be defined as a collection of instructions coded according to specific rules and in a specific sequence. As an example, code may be source code. As another example, code may be machine code. As it is used in this description, "cloud-computing system" generally refers to a system that utilizes a collection of virtual machines or other remote servers, rather than local servers or personal computers, to process, manage, or store user data. As it is used in this description, the term "server" generally refers to a computing device executing one or more software programs typically in a networked environment. However, a server may also be implemented as a virtual server (software programs) executed on one or more computing devices viewed as a server on the network. As used herein, the term "network" generally refers to a plurality of resources made available to users via a computer network. The Internet, for example, is a network.

As it is used in this description, "modulated data signal" generally refers to a signal that has one or more of its characteristics set or changed in such a manner as to encode information in the signal. As it is used herein, "null" generally refers to "not present."

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Various embodiments of the disclosed subject matter provide devices, methods, systems, services, and/or computer program products to provide any of a variety of data restructuring and visualization objectives. The various features of the embodiments disclosed herein can be used alone, or in varying combinations with each other and are not intended to be limited to the specific combination described herein. Thus, the scope of the claims is not to be limited by the illustrated embodiments.

This description may use the phrases "in an embodiment," "in embodiments," "in some embodiments," or "in other embodiments," which may each refer to one or more of the same or different embodiments in accordance with the disclosed subject matter.

Figure 1:
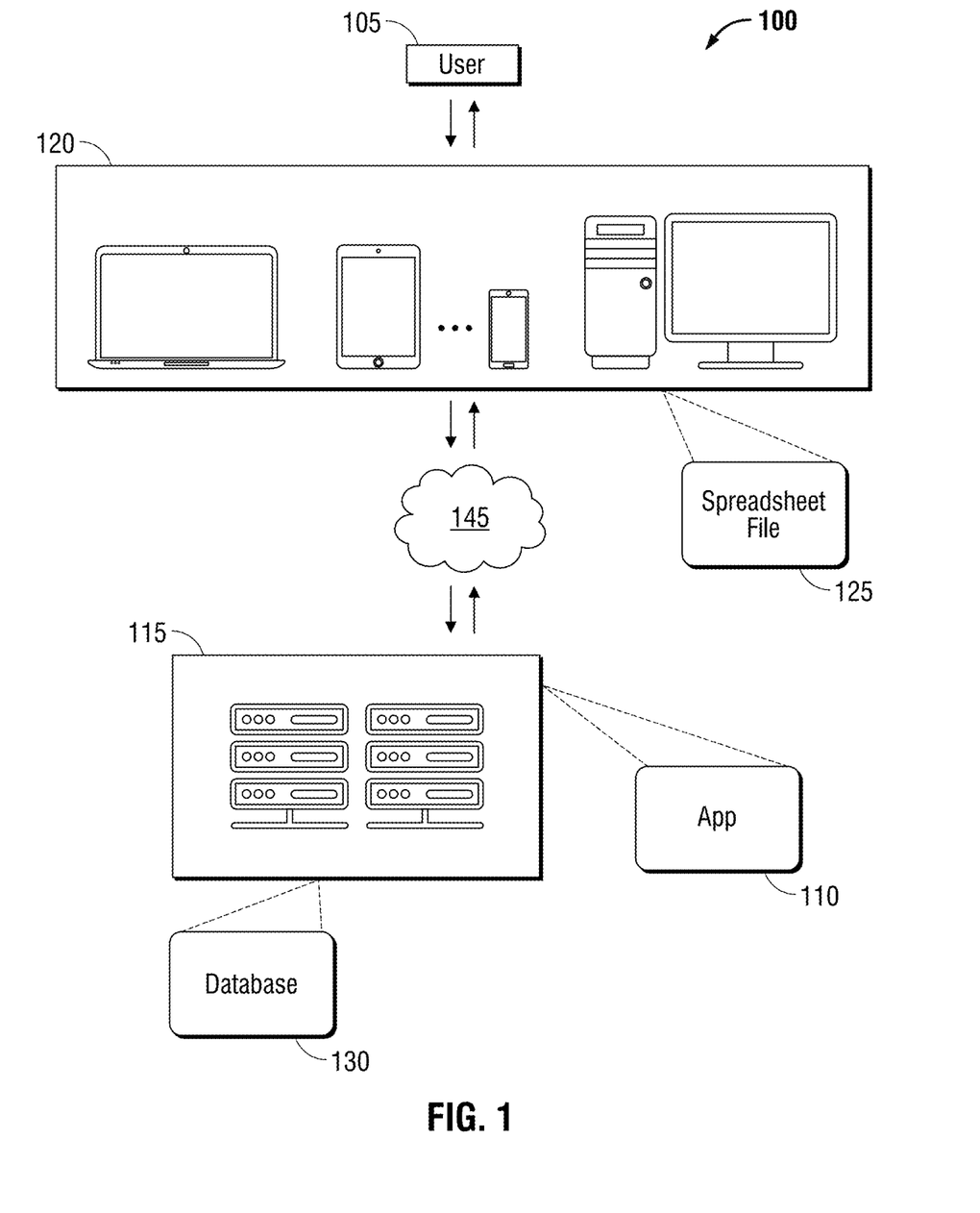
FIG. 1 illustrates a system including a network operating environment for data restructuring and visualization according to an embodiment of the present disclosure.

FIG. 1 illustrates a system 100 for data restructuring and visualization according to an embodiment of the present disclosure. According to the illustrated embodiment, the system 100 is employed by a user 105 and includes an application 110, resources 115, user devices 120, a spreadsheet file 125, a database 130 and a network 145. In general, the system 100 operates to provide a real time display or a substantially real time display of data included in the spreadsheet 125 in the form of a graph, a plot or some other form of chart which is displayed on one of the user devices 120 in possession of the user. Embodiments described herein employ the resources 115 and software code optimized to rapidly process spreadsheet data communicated from the user devices 120 to deliver the data in the form of a data visualization that is rendered for display on the device 120 in possession of the user 105. While FIG. 1 illustrates and describes the system 100 with reference to a single user, the embodiments described herein support any number of users each having their own unique account and their own spreadsheets for data visualization. As described herein, the structure and organization of the software code of the application 110 provides extremely efficient processing of spreadsheet data. This allows the system 100 to scale across thousands of users with no discernible degradation in performance for the user. That is, the system can scale across thousands of users while continuing to perform the operations of deconstructing, reconstructing and visualization in substantially real time.

The network 145 can include either or both of local-area networks (LANs), wide area networks (WANs), wireless communication, wired communication and may include the Internet. According to a further embodiment, the network 145 provides access to one or more remote devices, servers, application resource management and/or data storage systems, for example, the resources 145. In general, the system 100 provides for communication of the illustrated components with one another and/or with any of the other resources and devices coupled to the network 145. According to a further embodiment, the network 145 provides access "over-the-cloud" to one or more remote devices, servers, application resource management and/or data storage systems. The communication can include various forms of information and data including various types of digital files and data. Communication can occur using any of Wi-Fi networks, Bluetooth communication, cellular networks, satellite communication, and peer-to-peer networks available either alone or in combination with one another via the network 145. Depending on the embodiment, the network 145 may be any type and/or form of network known to those of ordinary skill in the art capable of supporting the operations described herein. Thus, other communication protocols and topologies can also be implemented in accordance with various embodiments.

The resources 115 includes computer resources, for example, a server or servers. In various embodiments, the resources 115 provide the tools and resources for receiving spreadsheets, deconstructing spreadsheets, organizing and storing the deconstructed spreadsheet data, reconstructing the spreadsheet data and communicating the reconstructed spreadsheet data to user devices 120. In various embodiments, the resources 115 include a processor, a memory and a network interface. The memory includes a plurality of programs including the application 110. Data storage included in the resources 115 can also include storage for one or a plurality of databases. Further, the data storage can be included in any aspect of a memory system, such as in RAM, ROM or disc, and may also be separately stored on one or more dedicated data servers included in the resources 115.

In various embodiments, the resources 115 include a central server or other cloud-accessed computing system. The resources 115 can be operated by a system operator. In one embodiment, the resources 115 are included as a software system hosted and maintained by an entity offering the user 105 access to the app 110 and the resources 115. Depending on the embodiment, the resources 115 can be hosted on one or more of a variety of computing devices such as a general purpose computer such as a PC, a laptop, a tablet computer, server, mobile phone or other computing device. According to one embodiment, the resources 115 are distributed across a plurality of computing devices. According to still another embodiment, one or more of the elements included in the resources 115 is also included in at least one of the user devices 120. For example, in some embodiments, the application 110 includes a mobile application. According to these embodiments, the mobile application is downloaded to the user devices 120. Further, a plurality of users each in possession one of the user devices 120 downloads the mobile application to their device where each application includes similar functionality. According to these embodiments, each of these mobile applications allow the user in possession of the device to access the resources 115. For example, the mobile application can provide an interface with an application operating on the resources 115.

According to embodiments where a mobile application is employed, the system 100 includes an application server (not illustrated) to allow users to download the mobile application. According to some embodiments, the application server is hosted by a third party service, for example, in an app store or other digital application distribution platform from which other applications unrelated to the spreadsheet data visualization application can also be accessed and downloaded. Well-known current examples include the iOS App Store operated by Apple and Google Play. According to other embodiments, the application server is provided by the entity that provides the resources 115. Accordingly, in some embodiments the application server is integrated into the services 115.

In various embodiments, the application 110 is hosted by the resources 115 for access to the processing performed by the resources 115. According to some embodiments, the application 110 is a web application hosted by the resources 115. According to these embodiments, the user devices 120 are employed to access the resources via a web browser. In various embodiments, the application 110 can run on hosting environments such as cPanel, Plesk, Linux, and Windows.

The user devices 120 can include any type of computing device suitable for communicating with the resources 115 via the network 145. Accordingly, the plurality of user devices of can include one or more of a variety of computing devices such as a general purpose computer such as a PC, a laptop, a tablet computer, a smartphone or other computing device. Embodiments of the disclosed subject matter may be implemented with a variety of user devices 120 capable of data communications with other devices, as well as to any of a central server or cloud-computing system that provide the resources 115 or to any other device that is network-connected. According to various embodiments, the user devices 120 are capable of running application software including spreadsheet software, such as, for example, MICROSOFT EXCEL, GOOGLE SHEETS, and APPLE NUMBERS. In embodiments, device 120 may be a hand-held computing device. Non-limiting examples of hand-held computing devices include cellular phones, personal digital assistants (PDAs), smartphones (Android-based, iOS-based, Windows Mobile-based, Windows Phone-based, BlackBerry OS-based and the like) and tablet computers (Android-based, iOS-based, Windows-based, BlackBerry OS-based and the like).

While MICROSOFT EXCEL provides the most well-known example of a spreadsheet file, the system can operate with any of a variety of spreadsheets depending on the embodiment. These can include simple .csv files, online spreadsheets, spreadsheets that are part of software product "suites" and standalone spreadsheets. The user 105 can have many spreadsheet files saved locally on their user device. The application 110 allows a user to select a spreadsheet file from those accessible via the user device. In some embodiments, this single user input "selecting a file" initiates a process that, independent of any further user input, automatically performs acts of: (a) transmitting the spreadsheet and an identification of the chart for receipt at the resources 115; (b) deconstructing, by the resources 115, the plurality of data-pairs such that the respective first values and the respective second values included in the plurality of data-pairs are organized separately from one another in the database 130; (c) reconstructing, by the resources 115, the plurality of data-pairs such that the respective first values and the respective second values are organized in a plurality of matched pairs, respectively, for representing as respective points in the chart; (d) associating the plurality of matched pairs with the chart; (e) transmitting the plurality of matched pairs to the first application on the device; and (f) displaying the chart with the first application on the device.

According to some embodiments, the database 130 is stored in data storage included in the resources 115. Depending on the embodiment, the database 130 can include any of a relational database, object-oriented database, unstructured database, or other database.

Figure 2:
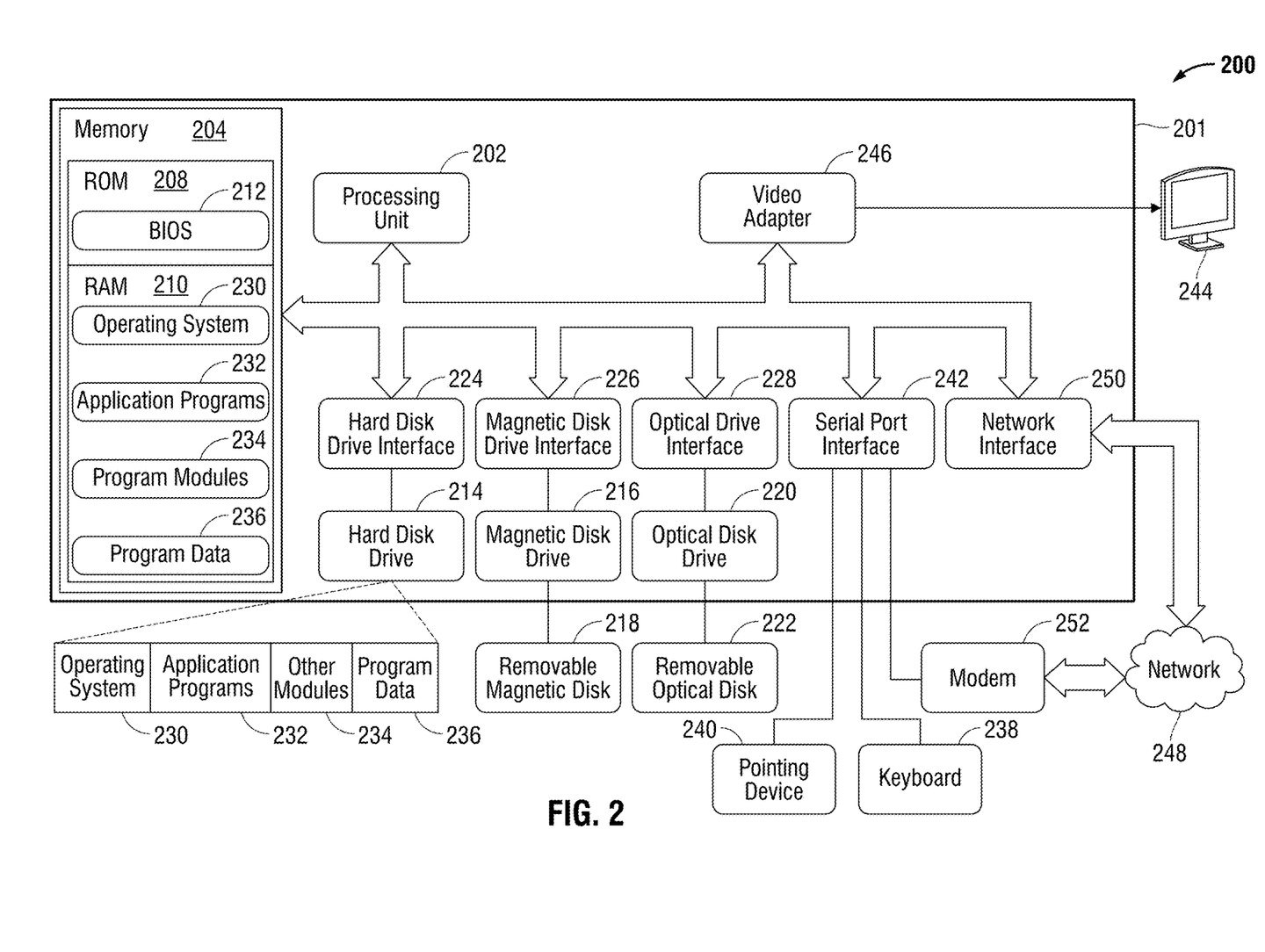
FIG. 2 depicts an example computing environment that can be used in connection with computer-implemented methods described in this description.

FIG. 2 illustrates merely an example computing environment 200, and is not intended to suggest any limitation as to the scope of use or functionality of a suitable computing environment. With reference to FIG. 2, an example computing environment 200 includes a computing device 201. Any one or more of devices 120 shown in FIG. 1 may be implemented using computing device 201, including one or more features of computing device 201 and/or alternative features. In some embodiments, computing device 201 may be a general-purpose computing device in the form of a personal computer, a mobile computer, or a workstation, for example, or computing device 201 may be a special purpose computing device. Embodiments of the disclosed subject matter may be implemented with general-purpose computers, specialized devices, or a combination of general-purpose and specialized computing devices. The description of computing device 201 provided herein is provided for purposes of illustration, and is not intended to be limiting. Embodiments of the disclosed subject matter may be implemented in further types of computer systems, as would be known to persons skilled in the relevant art(s).

As shown in FIG. 2, computing device 201 includes a processing unit 202, a memory 204, and a bus 206 that couples various system components including memory 204 to processing unit 202. Bus 206 represents one or more of any of several types of bus structures, including a memory bus or memory controller, a peripheral bus, an accelerated graphics port, and a processor or local bus using any of a variety of bus architectures. Memory 204 includes read only memory (ROM) 208 and random-access memory (RAM) 210. A basic input/output system 212 (BIOS) is stored in ROM 208.

Computing device 201 may include one or more of the following drives: a hard disk drive 214 for reading from and writing to a hard disk, a magnetic disk drive 216 for reading from or writing to a removable magnetic disk 218, and/or an optical disk drive 220 for reading from or writing to a removable optical disk 222 such as a CD ROM, DVD ROM, or other optical media. Hard disk drive 214, magnetic disk drive 216, and optical disk drive 220 are connected to bus 206 by a hard disk drive interface 224, a magnetic disk drive interface 226, and an optical drive interface 228, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media may be used to store data, such as flash memory cards, digital video disks, random access memories (RAMs), read only memories (ROM), and the like.

Figure 3:
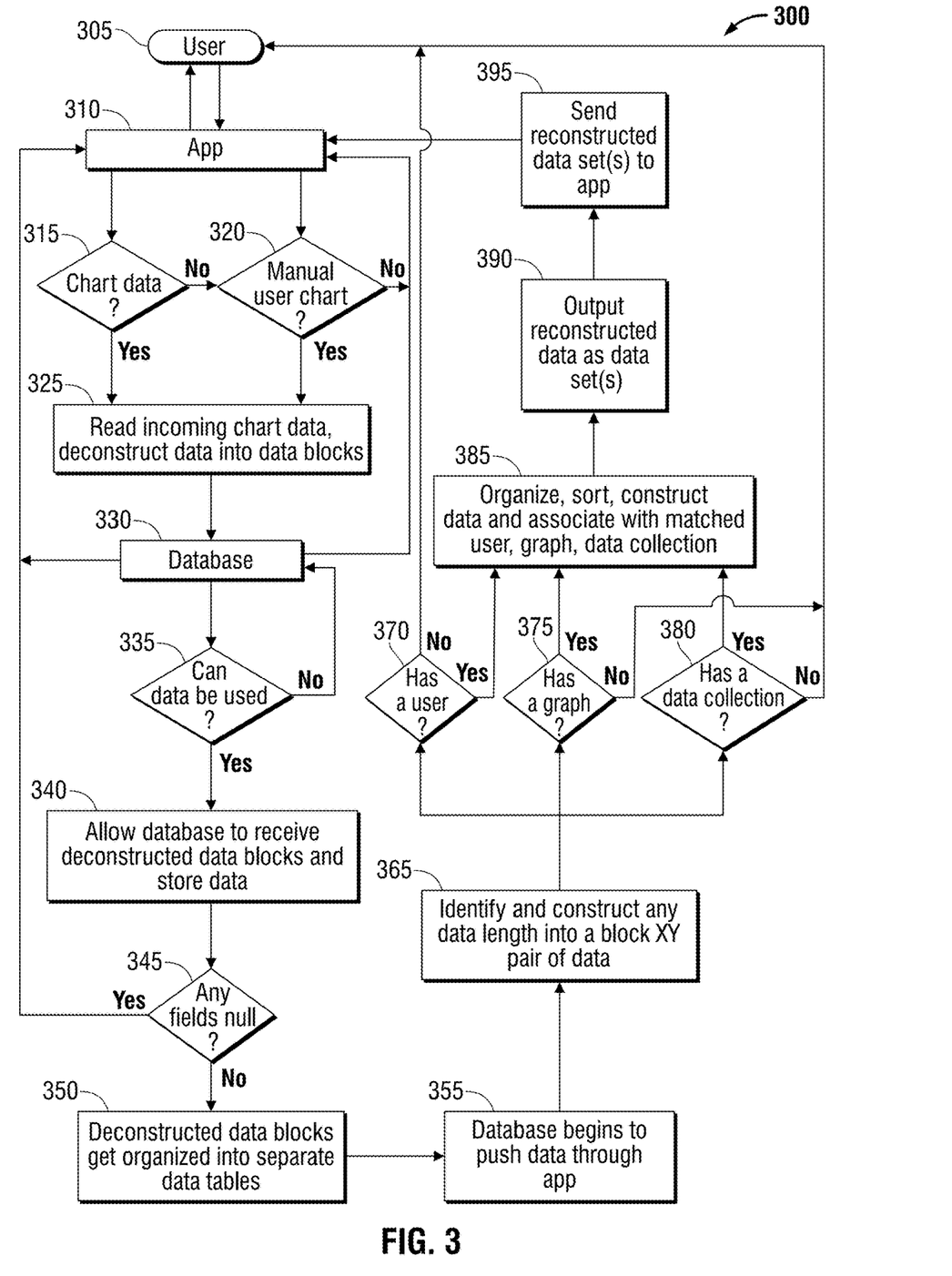
FIG. 3 is a flowchart illustrating a method of data restructuring and visualization according to an embodiment of the present disclosure.

A number of programs may be stored on the hard disk, magnetic disk, optical disk, ROM 208, or RAM 210. These programs may include an operating system 230, one or more application programs 232, other program modules 234, and program data 236. Application programs 232 or program modules 234 may include, for example, computer program logic for implementing flowchart 300 (including any block of flowchart 300), as described herein.

A user 105 may enter commands and information into the computing device 201 through input devices such as keyboard 238 and pointing device 240. Other input devices (not shown) may include a microphone, joystick, game pad, satellite dish, scanner, touch screen, camera, accelerometer, gyroscope, or the like. These and other input devices may be connected to the processing unit 202 through a serial port interface 242 that is coupled to bus 206, but may be connected by other interfaces, such as, for example, a parallel port, game port, or a universal serial bus (USB).

A display device 244 (e.g., a monitor) is also connected to bus 206 via an interface, such as a video adapter 246. In addition to display device 244, computing device 201 may include other peripheral output devices (not shown) such as speakers and printers.

Computing device 201 is connected to a network 248 (e.g., the Internet) through a network interface or adapter 250, a modem 252, or other means for establishing communications over the network. Modem 252, which may be internal or external, is connected to bus 206 via serial port interface 242.

As used herein, the terms "computer program medium" and "computer-readable storage medium" and "non-transitory computer-readable medium" are used to generally refer to media (e.g., non-transitory media) such as the hard disk associated with hard disk drive 214, removable magnetic disk 218, removable optical disk 222, as well as other media such as flash memory cards, digital video disks, random access memories (RAMs), read only memories (ROM), and the like.

As noted above, computer programs and modules (including application programs 232 and other program modules 234) may be stored on the hard disk, magnetic disk, optical disk, ROM, or RAM. Such computer programs may also be received via network interface 250 or serial port interface 242. Such computer programs, when executed or loaded by an application, enable computing device 201 to implement features of embodiments of the disclosed subject matter. Accordingly, such computer programs represent controllers of the computing device 201.

Some embodiments are also directed to computer program products comprising software (e.g., computer-readable instructions) stored on any computer-useable medium. Such software, when executed in one or more data processing devices, causes data processing device(s) to operate as described herein. Embodiments of the disclosed subject matter may employ any computer-useable or computer-readable medium, known now or in the future. Some examples of computer-readable mediums include storage devices such as RAM, hard drives, floppy disks, CD ROMs, DVD ROMs, zip disks, tapes, magnetic storage devices, optical storage devices, MEMS-based storage devices, nanotechnology-based storage devices, and the like. It will be recognized that the disclosed technologies are not limited to any particular computer or type of hardware.

Referring now to FIG. 3, in block 305, a user (e.g., user 105 shown in FIG. 1) makes connection to an app which is shown in block 310 (e.g., app 110 shown in FIG. 1). Using one or more devices (e.g., user device 120 shown in FIG. 1, which may be implemented as computing device 201 shown in FIG. 2), the user 105 uploads data. In block 315, a determination is made whether the data uploaded by the user 105 is chart data e.g., a spreadsheet such as, but not limited to, a spreadsheet generated by MICROSOFT EXCEL, GOOGLE SHEETS, and APPLE NUMBERS. Additionally, or alternatively, the user 105 may upload chart data through a manual entry of data and/or one or more datasets. In block 320 a determination is made whether the data uploaded by the user 105 is manually-input data. For example, the user 105 may take a spreadsheet file and upload it through app shown in shown in block 310, or the user 105 may choose to manually input data in XY pairs for each point in the graph. It will be recognized that manual entry of data can be accomplished in a variety of ways using various devices, including data entry devices, e.g., keyboard, mouse, webcam, touch screen, optical mark reader, pen, stylus and microphone.

The code is configured to read incoming chart data and deconstruct the data into smaller blocks of data, in block 325. In an embodiment, the process of deconstructing the data into smaller blocks of data includes separating all X values, all Y values, and all text field values from the uploaded spreadsheet file. The process of deconstructing the data into smaller blocks of data in accordance with embodiments of the present disclosure may additionally, or alternatively, include separating other attributes from the uploaded spreadsheet file. In embodiments, the user 105 may be prompted to select one or more attributes.

In an embodiment, the smaller blocks of data are submitted to a database (e.g., database 130 shown in FIG. 1). The server-side code is configured to determine whether the data can be used and/or is in the correct "format," in block 335. For example, the server-side code may be configured to determine if an incorrect file format is used, e.g., .doc extension, which, in this example, would result in sending an error message to the user 105 such as "Incorrect file type, extension, and/or format" or the like. In an embodiment, if the data is not in the correct "format," the database 130 sends a return error message back through the app 110, and the user 105 is prompted about the error by the front end of the app 110.

In block 340, if it is determined that the data can be used, the server-side code allows the database 130 within the server (e.g., server 115 shown in FIG. 1) to receive the deconstructed data blocks and stores the data. For example, if the uploaded file is a spreadsheet format, and there are not missing data values for the X and Y of the graph, and the X values are paired with the appropriate Y values, the server-side code then passes the data into the database. The database 130 populates whether any submitted fields and/or blocks of data are null, in block 345. In some embodiments, the server-side code would have already determined if any cells, fields, or the like are "null." For example, if a cell does not have an X value but does have a Y value, the database would record that the specific X value in this example would be registered as "null" in the database. In an embodiment, if it is null, then the database sends a return error message back through the app 110, and the user 105 may be prompted about the error by the front end of the app. For example, the error message received by the user 105 may be "Error—incomplete data. Please verify your X and Y values."

If not null, the server-side code begins to organize the deconstructed blocks of data into separate data tables, in block 350. In an embodiment, the server-side code takes the data through the database(s) in accordance with the protocol illustratively depicted in FIG. 4.

The server-side code begins preparing the deconstructed data blocks so that the app can read the incoming data, in block 355. An example computer program code segment for destructuring data, in accordance with an embodiment of the present disclosure, is set forth below.

```
module.exports=function(sequelize, DataTypes) {
    const ChartData=
        sequelize.define("ChartData", {xsValue:
        {
          type:
          DataTypes.STRING,
          allowNull: false
        }
    });
    ChartData.associate=function(models) {
      ChartData.belongsTo(models.ChartXs, {
        foreignKey: {
        allowNull:
        false
        }
      });
      ChartData.belongsTo(models.ChartLabel
        , {foreignKey: {
        allowNull: false
        }
      });
    };
      return ChartData;
```

Once the deconstruction is complete in block 355, the server-side code further deconstructs the data by identifying individual blocks of XY pairs of data, in block 365. An example computer program server-side code segment for carrying out operations to further deconstruct the data by separating the X values pair, in accordance with an embodiment of the present disclosure, is set forth below.

```
module.exports=function(sequelize, DataTypes) {
  const ChartXs=sequelize.define("ChartXs",
  {
    label: {
      type:
      DataTypes.STRING,
      allowNull: false
    }
  });
  ChartXs.associate=function(models) {
    ChartXs.belongsTo(models.Chart
      , {foreignKey: {
      allowNull: false
      }
    });
  };
    return ChartXs;
```

The XY pairs of data may vary in length and type. For example, the uploaded data may only be a total of five XY pair values. Another file may have 1,289 XY pair values, for example.

In some embodiments, for at least the reason that the XY pairs may vary in length and type, the server-side code checks if the code has a user (block 370), a graph (block 375), and data collection (block 380). If any XY pairs of data are missing a user, graph, and/or data collection, the XY pairs of data cannot be reconstructed without further processing. In an embodiment, in cases where one or more XY pairs of data are missing a user, graph, and/or data collection, the database sends a return error message through the app, and the user 105 may be prompted about the error by the front end of the app 110. If a user, graph, and data collection is present in connection with each XY pair of the XY pairs of data, the server-side code organizes, sorts, and constructs the data and associates with the matched user, graph, and data collection, in block 385. An example computer program server-side code segment for carrying out operations to reconstruct the X value(s) with the appropriate Y value(s) and form an XY pair, in accordance with an embodiment of the present disclosure, is set forth below.

```
module.exports=function(sequelize, DataTypes) {
  const DataXYPair=
    sequelize.define("DataXYPair", {id: {
    type:
    DataTypes.INTEGER,
    autoIncrement: true,
    primaryKey: true
    },
    xValue: {
      type:
      DataTypes.STRING,
      allowNull: false
    },
    yValue: {
      type:
      DataTypes.STRING,
      allowNull: false
    }
  });
  DataXYPair.associate=function(models) {
    DataXYPair.belongsTo(models.Graph, {foreignKey: {
      allowNull: false
      }
    });
  };
    return DataXYPair;
```

Once the blocks of data have been matched and reconstructed, the server-side code assembles the reconstructed data into one or more data sets, in block 390. An example computer program server-side code segment for carrying out operations to reconstruct the data with other related data and/or chart data or graph data, in accordance with an embodiment of the present disclosure, is set forth below.

```
function parseDatas(datasToProcess, req) {
    db.ChartCollection.create({
        chartName:
        req.body.chartName,UserId:
        req.user.id
    }).then(dbChart=>{
        datasToProcess.forEach((graph, index)=>{
            const graphkeys=
            Object.keys(graph);
            db.Graph.create({
                graphLabel: graph [graphkeys[0]], //braquet
                notationxName: graphkeys[0],
                ChartCollectionId: dbChart.id
            }).then(dbGraph=>{
                graphkeys.forEach((key, index)
                =>{if (index>0) {
                    db.DataXYPair.create({
                        xValue: graphkeys[index],
                        yValue:
                        graph[graphkeys[index]],
                        GraphId: dbGraph.id
                    })
                }
                });
            });
        });
    });
```

All requirements having been fulfilled, the server-side code is configured to push the reconstructed data set(s) to the app 110, in block 395. An example computer program server-side code segment for carrying out operations to finish the reconstruction process and associate the data and graph with the appropriate user, in accordance with an embodiment of the present disclosure, is set forth below.

```
module.exports=function(sequelize, DataTypes) {
    const ChartCollection=
        sequelize.define("ChartCollection", {chartName: {
            type:
            DataTypes.STRING,
            allowNull: false
        }
    });
    ChartCollection.associate=function(models) {
        ChartCollection.belongsTo(models.User,
            {foreignKey: {
                allowNull: false
            }
        });
        ChartCollection.hasMany(models.Graph
            , {onDelete: "cascade",
            onUpdate:
            "cascade",
            foreignKey: {
                allowNull: false
            }
        })
    };
    return ChartCollection;
};
```

In embodiments, the app 110 refreshes to allow the user 105 to see a completed graph on the client-side (app), regardless of which kind of Internet-connected device 120 is used.

Figure 4:
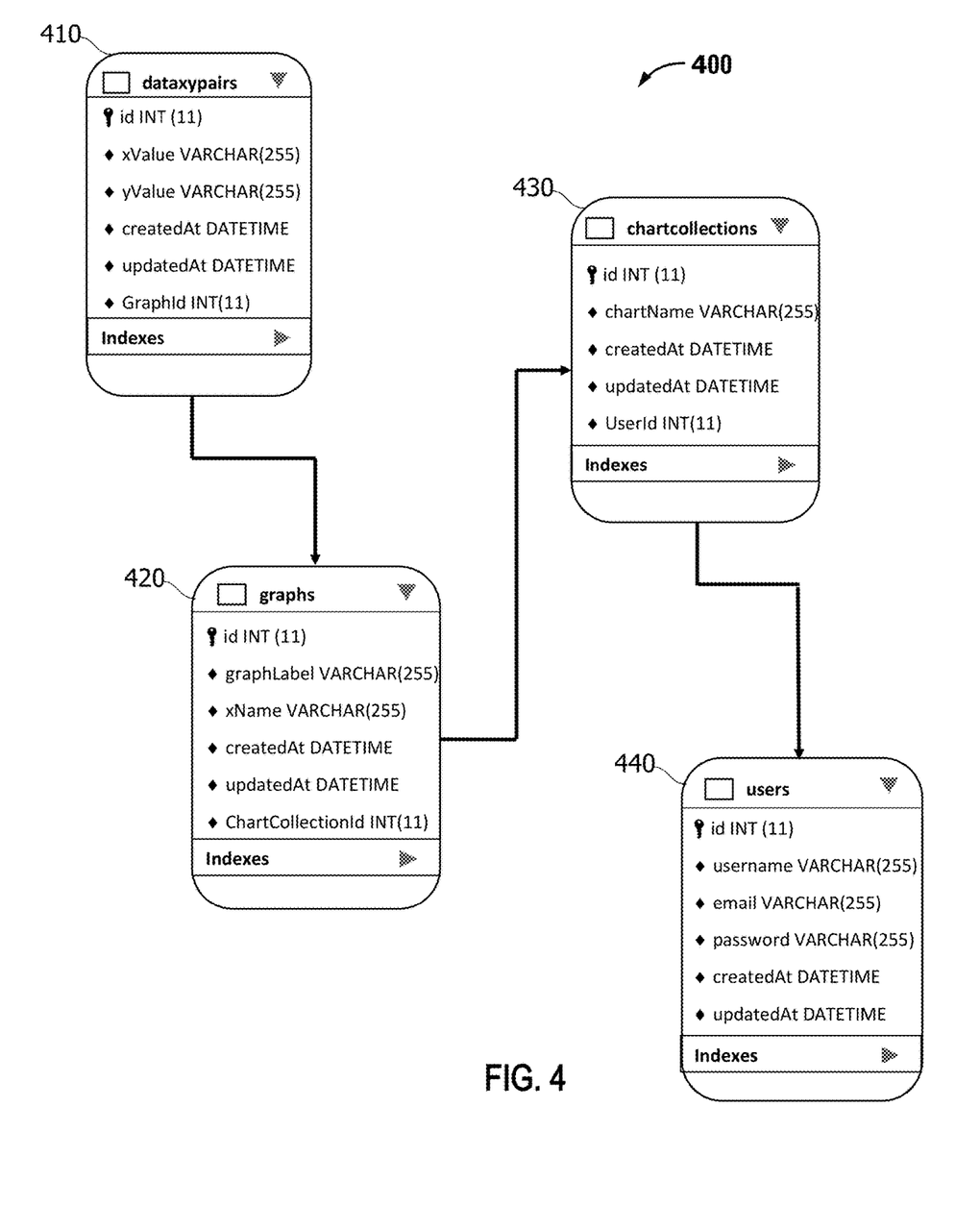
FIG. 4 is a block diagram illustrating a protocol for server-side code according to an embodiment of the present disclosure.

FIG. 4 is a block diagram illustrating a protocol for server-side database processing according to an embodiment of the present disclosure.

In the embodiment illustrated in FIG. 4, the block 410 (also referred to as "dataxypairs 410") depicts code associated with destructuring and restructuring data with an improved method so that the data is received from the uploaded spreadsheet file and then sent to the block 420. Block 420 (also referred to as "graphs 420") depicts code associated with displaying the restructured data as a chart, e.g., "graph." From graphs 420, the data connects to the block 430 (also referred to as "chartcollections 430"). In embodiments, chartcollections 430 is a database that is associated with the end user's account. The block 440 (also referred to as "users 440") depicts code associated with connecting the end user's account.

In accordance with embodiments of the presently-disclosed data restructuring and visualization systems and methods, when in use, the end user may create an account and/or log into an account and be provided with the capability to view a user dashboard. In embodiments, the user dashboard may provide a variety of information, such as, for example, account information and/or any processed (e.g., destructured/restructured) data. In circumstances where data is not processed, there will be no charts to be displayed, and chartcollections 430 will be null of data. In circumstances where any data has been processed, an identifier associated with the data/chart (e.g., project name, filename, codeword, etc.) is listed within the end user's account (e.g., chartcollections 430) and the end user is provided with the capability to select a desired chart, in order to view the processed data on user device 120. In some embodiments, such as illustrated in FIG. 4, the processed data/chart is differentiated due to the time signature associated with the upload, "createdAtDATETIME" and "updatedAtDATETIME" code associated with specific action(s) depending on end user usage.

In various embodiments of the presently-disclosed data restructuring and visualization systems and methods, the database/server-side code may be on the same server. Alternatively, the database/server-side code may reside on two or more servers.

In accordance with embodiments of the presently-disclosed data restructuring and visualization systems and methods, by processing most of the code on the server-side, the overall performance of this protocol is increased, as compared to the conventional method of client side (e.g., browser) processing which unavoidably slows down performance.

In general, an EXCEL spreadsheet file can only have a maximum file size of 2 GB, with conventional methods of inputting and displaying data. The presently-disclosed data restructuring and visualization systems and methods do not require opening a spreadsheet via the software associated with that spreadsheet. In accordance with embodiments of the presently-disclosed data restructuring and visualization systems and methods, the use of machine-parts-only to process the server-side code effectively means there is no limit to the amount of data that can be processed through the app 110 because of the capability to scale up/down if and when necessary. The presently-disclosed data restructuring and visualization systems and methods therefore avoid and/or eliminate the traditional 2 GB limit.

Under conventional methods of uploading files through the Internet, the files are uploaded through the user's local browser and/or computer. In embodiments of the presently-disclosed data restructuring and visualization method, the file is processed through the server's hardware and installed on one or more of the following: the server's RAM, processor(s), microprocessor(s), motherboard and/or hard drives, whether solid-state hard drives or optical hard drives or the like, which will not affect the end user's local computer or browser. In an embodiment of the presently-disclosed data restructuring and visualization method, the processing occurs within the server 115 via the server-side code.

In accordance with embodiments of the presently-disclosed data restructuring and visualization method, processing performance is increased, even though an Internet connection provides the initial request to the server. Substantial performance improvement in processing data can be realized when the app 110 is used in a large-scale application. Fundamentally, as more end users use the app 110, and thus more data is being processed, rather than "bog down" the server, the server data processing scales up so that there is no drop in performance. As the number of users increases and the data exponentially increases, in accordance with embodiments of the presently-disclosed data restructuring and visualization method, the data processing taps into more server space and/or processing automatically; as a result, there is no "bottlenecking" or "chokepoints" apparent to the end user (e.g., the code automatically scales up the user experience).

The performance improvement in processing data is attained through the use of machine-parts-only to process the server-side code; this is a technical improvement in the functionality of an existing technological process, which otherwise requires an Internet connection to even begin the processing of a protocol. Rather than use the Internet browser for processing the data, the user 105 prompts a request to process the data through the initial Internet connection with the app 110. The app 110 is configured to transmit a request to the server 115. Once the request is received at the server 115, the server-side code begins processing the data. By the time it is processing at the server 115, the server 115 utilizes its machine parts to process, rather than the machine parts found in the user's local computer. Once the processing is complete within the server 115, the server-side code returns the completed destructuring/restructuring task through the Internet connection to the app 110 so that the results can be displayed on the user device 120.

In conventional methods of transferring large files, or files in general, the user's computing device typically displays a status bar indicative of the percentage completed during the file transfer progress. In the convention methods, file transfers typically require minutes, sometimes hours, etc., with smaller files tending to require only minutes to seconds. In accordance with embodiments of the presently-disclosed data restructuring and visualization systems and methods, data uploading and processing can be accomplished in less than one second (in stark contrast to traditional methods requiring seconds, minutes, or even hours).

In accordance with embodiments of the presently-disclosed data restructuring and visualization systems and methods, an improvement in technology is the new solution of parsing data/datasets within a spreadsheet without the need to open the spreadsheet. The end user uploads the spreadsheet file into app 110, the data is destructured and parsed server-side (as opposed to client-side as in traditional methods), to ultimately restructure the data/data sets client-side only when the data/datasets are completely present and restructured, per the code's protocol (otherwise, there would be a "null" result, or a "blank space" where the chart would have displayed).

In accordance with embodiments of the presently-disclosed data restructuring and visualization systems and methods, a further improvement in technology is the fact that the application does not have to refresh the entire "page" (as traditionally would when, for example, parsing server-side code in order to display, for example, a website on the client-side). Rather than having to refresh the entire page, the presently-disclosed data restructuring and visualization systems and methods only updates the client-side section of the application where a chart or charts will display. Advantageously, this creates a performance improvement and ultimately makes for a better user experience ("UX" in coding terms) due to the increased performance, efficiency, ease-of-use (ergonomics). Additionally, in accordance with embodiments of the presently-disclosed data restructuring and visualization systems and methods, not having to parse client-side means there is no need to worry about the speed of the internet connection as there is no rendering client-side (only server-side)—this advantageously avoids and/or eliminates the longer load times that are routinely experienced using traditional methods (e.g., WordPress sites taking too long to load, apps crashing and/or not scaling up or down properly, etc.).

The presently-disclosed methods of parsing data, e.g., spreadsheet data, utilizes code configured to allow for scaling up more requests (to parse, render and/or process) without overwhelming the server/machine parts, etc. Advantageously, in accordance with embodiments of the presently-disclosed data restructuring and visualization systems and methods, the increased efficiency and the parsing server-side means that the presently-disclosed methods are more search engine optimization (SEO) friendly (as opposed to the traditional methods of parsing client-side websites, applications, etc.).

In the traditional methods of parsing client-side, where search engines may or may not crawl, or may partially crawl but not completely crawl their bots across all of the code within the websites/applications, most search engines would see this as a negative consequence and, therefore, result in the website, application, etc. not becoming visible and/or less likely to become visible in search engines. Advantageously, in accordance with embodiments of the presently-disclosed data restructuring and visualization systems and methods, not having to parse client-side means the negative consequences due to parsing server-side are avoided.

In the presently-disclosed data restructuring and visualization systems and methods, the display of a status bar indicative of the percentage completed is not needed because the performance of the presently-disclosed data restructuring and visualization method is so efficient. The app 110 is configured to process the data while destructuring and restructuring the data and displays the resulting graph to the user 105 virtually instantaneously even while utilizing an Internet connection to travel, anywhere in the world, between the user 105 and the one or more servers 115. Embodiments of the presently-disclosed data restructuring and visualization systems and methods are capable of uploading a file and processing the data within the file, to enable the display of a graph on the user device 120 within an extraordinarily short time interval, which may be measured in fractions of a second. The code and the server-side code may be configured to work with one or more servers 115 and one or more machine parts within that server(s).

In various embodiments, the entered data set may be a singular data set or multiple data sets. In general, the more data sets submitted through the app 110, the more charted graphs generated by the app 110. In some embodiments, where there are multiple graphs charted, the app's usage becomes heuristic; for example, the app 110 provides the user 105 with more on-demand-data to draw their own correlations and/or conclusions that may not have been readily apparent when first obtaining the data set(s). In one embodiment, where there are at least two different data spreadsheet files, at least two different charted graphs are generated by the app 110, wherein one or more data set(s) from one spreadsheet file will be represented in one primary color (of different shades of the same primary color if multiple data sets) and one or more data set(s) from the second spreadsheet file will be represented by another primary color (of different shades of the same assigned primary color if multiple data sets). In accordance with embodiments of the present disclosure, the app 110 may be configured to provide a user 105 with the capability to update the data table title and fields so that one or more elements are labeled on the charted graph. For example, app 110 may be configured to prompt a user 105, or otherwise determine, whether the user 105 wants a quick result/analysis of the data set(s) and, in such case, the user option to enter data table title and fields (for purposes of labeling on the charted graph) may be delayed or skipped altogether.

More generally, various implementations of the presently-disclosed subject matter may include or be implemented in the form of computer-implemented processes and apparatuses for practicing those processes. The disclosed subject matter also may be implemented in the form of a computer program product(s) having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

Implementations may use hardware that includes a processor, such as a general-purpose microprocessor and/or an Application Specific Integrated Circuit (ASIC) that includes all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Example

In a simple, nonlimiting example, an end user has a spreadsheet by the filename "spreadsheet-data.xcl" and within that spreadsheet there are 2 columns of plot points, "X" and "Y." Assume plot points X=1, 2, 3 and Y=24.3, 58.2, 39.7 comprise the datasets (or, simply, "data").

The end user uploads "spreadsheet-data.xcl" into the app 110. In embodiments, while the spreadsheet file is uploading, the code receives the data and begins destructuring each X data individually and each Y data individually. The code is configured to make a determination whether the appropriate X data is associated with the appropriate Y data, for example, via the XYPairs code. Otherwise, if this determination were not made (to ensure that the appropriate X data is associated with the appropriate Y), the existence of only random plot points with no correlation or association would go undetected, resulting in failure to produce a valid graph (for example, if the string returned client-side was 58.2, 1, 39.7, 3, 2, 24.3, this would not display a graph with data that correlates).

The XYPairs code is configured to correlate and/or associate with the appropriate sets of data (datasets), e.g., [X1 (=1) paired with Y1 (=24.3); X2 (=2) paired with Y2 (58.2); X3 (=3) paired with Y3]. In this example, the code "DataXYPair=xValue and yValue; DataXYPair.associate" is used.

In this example, the server-side code also begins to associate and/or restructure the DataXYPair to the appropriate User and User's chart/graph within the User's account with the application via "DataXYPair.belongsTo(models. Graph)."

```
DataXYPair.associate=function(models) {
  DataXYPair.belongsTo(models. Graph, {
    foreignKey: {
      allowNull:
      false
    }
  });
};
```

When that the X and Y is associated as a DataXYPair to an associated User, the client-side code can acknowledge the existence of all prerequisites in order to execute the data and code if all prerequisites are present with the code, "return DataXYPair" which will prompt parsing the data. If the data is present, and the appropriate User's "ChartCollection" is present, then the graph will display client-side to the end user, with the code execution, "return ChartCollection." Otherwise, a portion of the display screen may appear blank, due to all or some of the required data is "null."

Figure 5A:
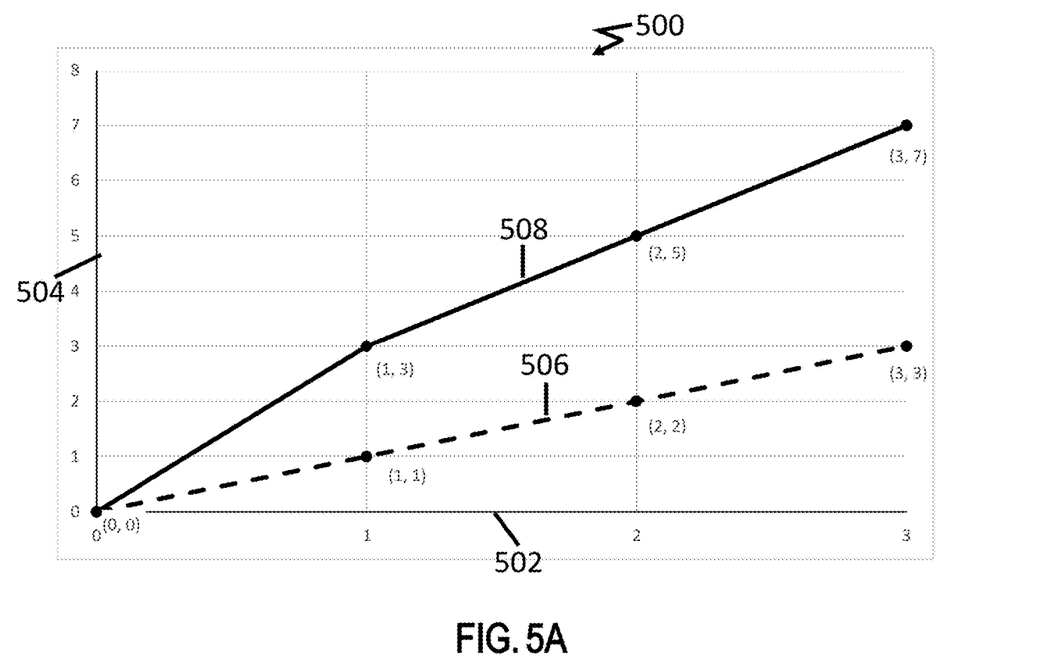
FIGS. 5A and 5B illustrate data visualizations generated in accordance with computer-implemented methods described in this description.
Figure 5B:
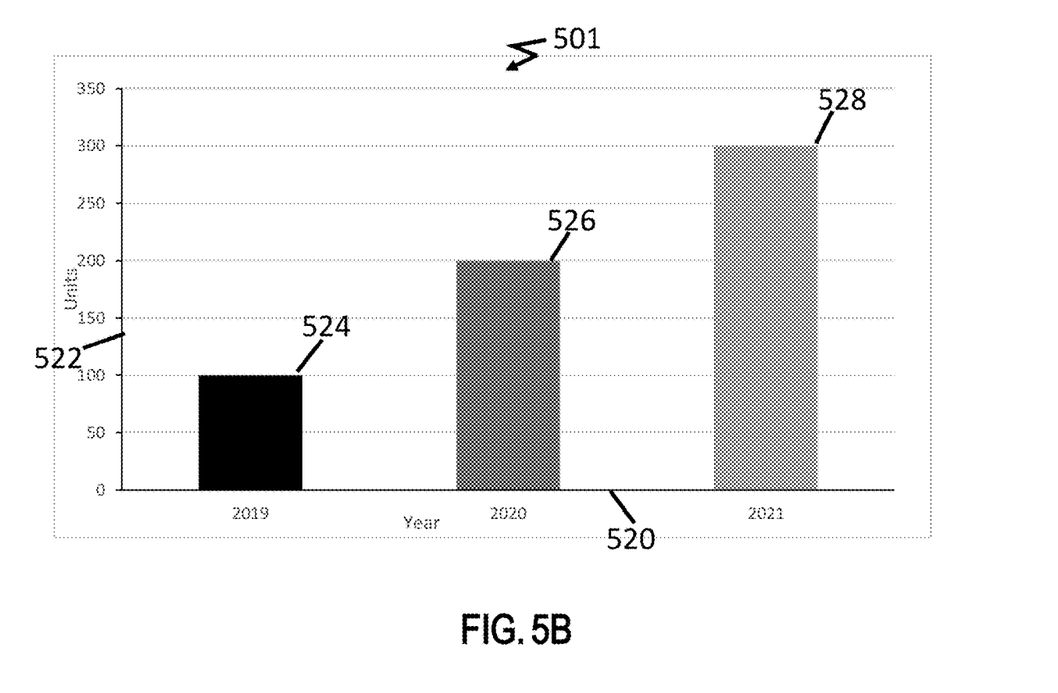

Referring now to FIGS. 5A and 5B data visualizations rendered for display are illustrated in accordance with various embodiments. FIG. 5A provides a data visualization in the form of a plot 500. The plot 500 includes an x-axis 502, a y-axis 504, a first number line 506 and a second number line 508. The first number line 506 is formed by connecting a plurality of points where each point is defined by a data-pair. Here, the data-pairs each include an x-value and a y-value, respectively. For example, the data-pairs (0, 0), (1, 1), (2, 2) and (3, 3). The second number line 508 is formed by connecting a plurality of points where each point is also defined by a data-pair. Here, the data-pairs include the following x-y-pairs, respectively, (0, 0), (1, 3), (2, 5) and (3, 7).

According to some embodiments, the plot 500 provides a data-visualization concerning units of a quantified metric plotted against time. In FIG. 5A, the quantified metric is represented by the values on the y-axis and units of time are represented by the values on the x-axis. The first number line 506 and the second number line 508 provide respective graphs for two different quantified metrics tracked over the same period. For example, at time=0 there are zero of the measured objects for both the first number line 506 and the second number line 508. This represents, for example, a count of an item before production has started. For purpose of explanation, the first number line 506 can represent a production of chicken eggs by hens that are provided a first controlled environment. The second number line 508 can represent a production of eggs by hens that are provided a second controlled environment. The controlling factors can include diet and movement of the hens. For example, the first number line 506 can be formed by connecting data points for hens that are kept in cages with a grain diet. In this example, the second number line 508 can be formed by connecting data points for hens that are allowed to free range and feed on grass and insects.

Here, the x-axis represents units of time and the y-axis represents units of production. For example, in various embodiments, the increments along the y-axis can include a quantity of one egg per increment, a quantity of a dozen eggs per increment, or a quantity of a hundred eggs per increment. For these examples, the units along the y-axis provide a range of 0-8 eggs, 0-8 dozen eggs and 0-800 eggs, respectively. The units of time indicated along the x-axis can also vary. For example, in various embodiments, the x-axis can include one day per increment, one week per increment, or one month pre increment. For these examples, the units along the x-axis provide a range of 0-3 days, 0-3 weeks and 0-3 months, respectively.

The relationships and/or functions need not be linear and can represent more complex functions and more complex relationships. Plots, graphs and other charts for these relationships can provide any of the wide variety of data visualizations that will be apparent to those of ordinary skill in the art in view of the disclosure provided herein. In addition, the data visualization can represent multi-dimensional data for more than two dimensions. In one simplified example, a plot includes a third axis, for example, a z-axis.

The preceding illustrates that the plot 500 is employed to provide a data visualization concerning productivity with units of time plotted with reference to the x-axis. Further, although the chart illustrated in FIG. 5 includes a visualization in the form of a plot 500, other forms data visualizations for displaying information can be used in various embodiments, for example, bar graphs, pie charts, scatter plots, histograms, etc.

Referring now to FIG. 5B, a bar chart 501 is illustrated in accordance with one embodiment. The bar chart 501 includes an x-axis 520, a y-axis 522, a first bar 524, a second bar 526 and a third bar 528. The x-axis refers to "Year" and the y-axis refers to "Units". According to the illustrated embodiment, each bar 524, 526, 528 has a magnitude, respectively, where the magnitude corresponds to a quantity of units. The values along the x-axis include the years "2019", "2020" and 2021". The units are identified by a series of indicia that increase in 50 unit increments from 0 to 350.

The bar graph 501 can also be defined by data-pairs or "x-y pairs". For example, the first bar 524 includes the data-pair (2019, 100), the second bar 526 includes the data pair (2020, 200), and the third bar 528 includes the data pair (2021, 300). Referring again to magnitudes, the bars 524, 526, 528 have magnitudes of 100, 200, and 300, respectively.

Figure 6:
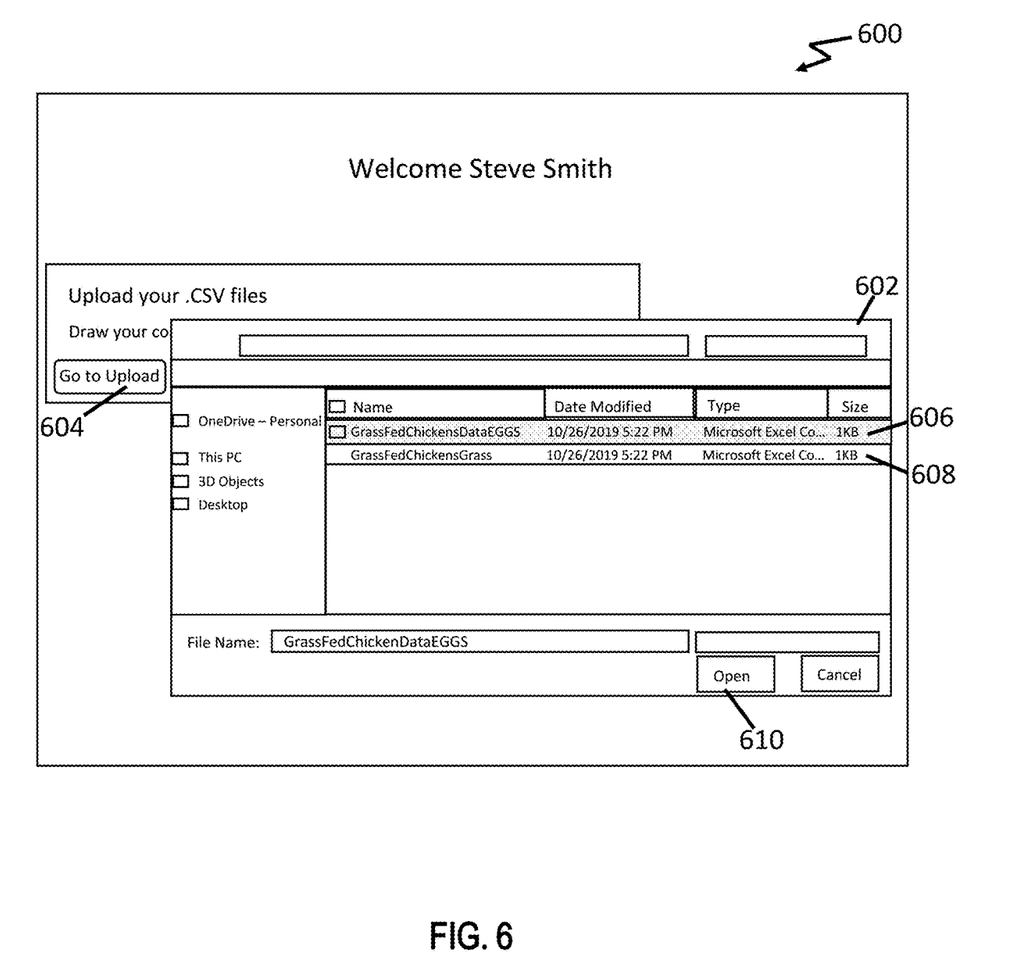
FIG. 6 illustrates a user interface presented in a display for initiating a process for data visualization according to embodiments of the present disclosure.

Referring now to FIG. 6, a user interface 600 presented in a user device (for example, one of the user devices 120) is illustrated in accordance with one embodiment. The user interface 600 allows the user to operate the software application (the app 100) in the display for initiating a process for data visualization of spreadsheet data. The user interface 600 includes a window 602 and a plurality of display objects that allow the software application to receive inputs from the user. In the illustrated embodiment, the display objects include a first display object 604, a second display object 606, a third display object 608 and a fourth display object 610. The first display object 604 includes a "Go to Upload" button rendered in the user interface 600. The second display object 606 includes a first spreadsheet file. The third display object 608 includes a second spreadsheet file. The fourth display object 610 includes an "Open" button rendered in the user interface 600. According to one embodiment, the user interface 600 is a graphical user interface presented in the display of a personal computer. Alternatively, the user interface 600 can be a graphical user interface presented in the display of a mobile device, for example, a tablet computer or smartphone. In this alternate embodiment, the fourth display object 610 can be eliminated and the second display object 606 and the third display object 608 can be replaced with display objects in the form of separate icons where each icon represents one of the respective files.

As described above, a single user input "selecting a file" can initiate a process that, independent of any further user input, automatically performs acts of: (a) transmitting the spreadsheet and an identification of the chart for receipt at the resources 115; (b) deconstructing, by the resources 115, the plurality of data-pairs such that the respective first values and the respective second values included in the plurality of data-pairs are organized separately from one another in the database; (c) reconstructing, by the resources 115, the plurality of data-pairs such that the respective first values and the respective second values are organized in a plurality of matched pairs, respectively, for representing as respective points in the chart; (d) associating the plurality of matched pairs with the chart; (e) transmitting the plurality of matched pairs to the first application on the device; and (f) displaying the chart with the first application on the device.

According to the illustrated embodiment, the user first selects the first display object 604. The application opens the window 602. The user selects a spreadsheet file, for example, represented as the shaded second display object 606. The user then selects the fourth display object 610. In these embodiments, a selection of the fourth display object 610 acts as the single user input to initiate the above-process and acts (a)-(f) are then automatically performed by the software application. Referring again to embodiments where the user device is a handheld mobile device, the user interface 600 presents icons to represent the spreadsheets. In these embodiments, the fourth display object 610 is not provided. Instead, a selection of the icon representing the desired spreadsheet is selected by the user. This file selection (via icon) acts as the single user input to initiate the above-process and acts (a)-(f) which are automatically performed by the software application. The preceding can be completed via a touchscreen input in various embodiments.

According to some embodiments, the user devices 120 respond to inputs received from a user, for example, through a touch-sensitive display. According to alternate embodiments, the user can navigate and take actions with the software application using a cursor rendered in the graphical user interface, for example, the cursor can be positioned using a mouse, touchpad or other input device. In further embodiments, the application can be accessed and navigated to select a spreadsheet and initiate a process for deconstruction and data visualization via voice commands where the user device includes a speech recognition system.

Embodiments of the disclosed subject matter generally relate to a plurality of devices, which may include intelligent, network-connected devices that communicate with each other and/or with a central server or a cloud-computing system to provide any of a variety of data restructuring and visualization objectives.

Embodiments of the presently-disclosed data restructuring and visualization systems and methods are described as utilizing JavaScript code. It is to be understood that JavaScript code used herein is for the purpose of describing particular embodiments only, and is not intended to be limiting. In general, embodiments can be coded in JavaScript or any other JavaScript-foundational language or technology, for example, React Native offered by Meta Platforms, Inc. Different programming languages can be employed in other embodiments including any of current versions, earlier versions and future versions of: HTML5, CSS, JavaScript version ES2015, PHP, Python, MERN, MEAN, jQuery, Node JS, React JS, Express JS, Angular JS, Swift, MongoDB, SQL, MySQL, Firebase, Java, C #, C++, AWS, Heroku, Bootstrap 5, Handlebars, and Git.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. The deconstruction of data provided in a spreadsheet for the later reconstruction of the data employed in generating a data visualization is one such example. Performing the preceding in substantially real-time is a further example.

Each computer program within the scope of the claims below may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors.

Any step or act disclosed herein as being performed, or capable of being performed, by a computer or other machine, may be performed automatically by a computer or other machine, whether explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer implemented method for creating at least one of a chart, plot or graph using an application operating on a device including a graphical user interface presented in a display, the application in communication with a remote server including a database, the method comprising:
   selecting, with a first application, a spreadsheet for uploading to the remote server by employing the graphical user interface to operate the first application displayed in the graphical user interface, the spreadsheet made using a second application and including a plurality of data-pairs each including a first value and a second value, respectively, each of the data-pairs suitable for representing as a point, respectively, in a chart that includes at least one of a plot or a graph; and
   receiving, with the first application, a single input to the graphical user interface and automatically, in response to receipt of the single user input:
   (a) transmitting the spreadsheet and an identification of the chart for receipt at the remote server;
   (b) deconstructing, by the remote server, the plurality of data-pairs such that the respective first values and the respective second values included in the plurality of data-pairs are organized separately from one another in the database;
   (c) reconstructing, by the remote server, the plurality of data-pairs such that the respective first values and the respective second values are organized in a plurality of matched pairs, respectively, for representing as respective points in the chart;
   (d) associating the plurality of matched pairs with the chart;
   (e) transmitting the plurality of matched pairs to the first application on the device; and
   (f) displaying the chart with the first application on the device.

2. The computer implemented method of claim 1, further comprising receiving as the single input a user's selection of the spreadsheet.

3. The computer implemented method of claim 1, wherein the act (b) includes:
   storing in the database each respective first value in a first dataset organized in a first table; and
   storing in the database each respective second value in a second dataset organized in a second table.

4. The computer implemented method of claim 3, further comprising associating the first data table and the second data table with a first user, a first graph and a first data collection.

5. The computer implemented method of claim 3, wherein the spreadsheet includes text, and wherein the method further comprises:
   storing in the text in the database in a third table that is separate from each of the first table and the second table, respectively.

6. The computer implemented method of claim 5, further comprising:
- including transmitting the text to the first application in the act (e); and
- including the text in the act (f).

7. The computer implemented method of claim 1, further comprising completing the acts (a)-(f) in substantially real time.

8. The computer implemented method of claim 1, further comprising completing the acts (c) based on an association of the respective first values and respective second values, the association completed by selecting the plurality of data-pairs with only a reference to an x-axis value in each of the plurality of data-pairs.

9. A non-transitory computer-readable medium comprising computer program instructions executable by at least one computer processor to perform a method for creating at least one of a chart, plot or graph using an application operating on a device including a graphical user interface presented in a display, the application in communication with a remote server including a database, the method comprising:
- selecting, with a first application, a spreadsheet for uploading to the remote server by employing the graphical user interface to operate the first application displayed in the graphical user interface, the spreadsheet made using a second application and including a plurality of data-pairs each including a first value and a second value, respectively, each of the data-pairs suitable for representing as a point, respectively, in a chart that includes at least one of a plot or a graph; and
- receiving, with the first application, a single input to the graphical user interface and automatically, in response to receipt of the single user input:
  - (a) transmitting the spreadsheet and an identification of the chart for receipt at the remote server;
  - (b) deconstructing, by the remote server, the plurality of data-pairs such that the respective first values and the respective second values included in the plurality of data-pairs are organized separately from one another in the database;
  - (c) reconstructing, by the remote server, the plurality of data-pairs such that the respective first values and the respective second values are organized in a plurality of matched pairs, respectively, for representing as respective points in the chart;
  - (d) associating the plurality of matched pairs with the chart;
  - (e) transmitting the plurality of matched pairs to the first application on the device; and
  - (f) displaying the chart with the first application on the device.

10. The non-transitory computer-readable medium of claim 9, the method further comprising:
- receiving as the single input a user's selection of the spreadsheet.

11. The non-transitory computer-readable medium of claim 9, wherein the act (b) includes:
- storing in the database each respective first value in a first dataset organized in a first table; and
- storing in the database each respective second value in a second dataset organized in a second table.

12. The non-transitory computer-readable medium of claim 11, further comprising associating the first data table and the second data table with a first user, a first graph and a first data collection.

13. The non-transitory computer-readable medium of claim 11, wherein the spreadsheet includes text, and wherein the method further comprises:
- storing in the text in the database in a third table that is separate from each of the first table and the second table, respectively.

14. The non-transitory computer-readable medium of claim 13, further comprising:
- including transmitting the text to the first application in the act (e); and
- including the text in the act (f).

15. The non-transitory computer-readable medium of claim 9, further comprising completing the acts (a)-(f) in substantially real time.

16. The non-transitory computer-readable medium of claim 9, further comprising completing the acts (c) based on an association of the respective first values and respective second values, the association completed by selecting the plurality of data-pairs with only a reference to an x-axis value in each of the plurality of data-pairs.

* * * * *